US009547415B2

(12) United States Patent
Lazzaro et al.

(10) Patent No.: US 9,547,415 B2
(45) Date of Patent: Jan. 17, 2017

(54) SUITE-WIDE NAVIGATION

(75) Inventors: Adrien Lazzaro, Foster City, CA (US); Mark Shurtleff, Oakland, CA (US)

(73) Assignee: Oracle International Corporation, Redwood Shores, CA (US)

(*) Notice: Subject to any disclaimer, the term of this patent is extended or adjusted under 35 U.S.C. 154(b) by 1697 days.

(21) Appl. No.: 11/742,043

(22) Filed: Apr. 30, 2007

(65) Prior Publication Data

US 2008/0270948 A1   Oct. 30, 2008

(51) Int. Cl.
*G06F 3/0482* (2013.01)

(52) U.S. Cl.
CPC .................................. *G06F 3/0482* (2013.01)

(58) Field of Classification Search
CPC ................................................... G06F 3/0482
USPC ......................................................... 715/854
See application file for complete search history.

(56) References Cited

U.S. PATENT DOCUMENTS

| | | | | | |
|---|---|---|---|---|---|
| 5,714,977 | A | * | 2/1998 | Mc Neil | 345/157 |
| 5,808,914 | A | * | 9/1998 | Shin et al. | 703/2 |
| 6,166,778 | A | * | 12/2000 | Yamamoto et al. | 348/569 |
| 6,369,837 | B1 | * | 4/2002 | Schirmer | 715/764 |
| 7,058,902 | B2 | * | 6/2006 | Iwema et al. | 715/810 |
| 7,590,972 | B2 | * | 9/2009 | Axelrod et al. | 717/117 |
| 2002/0116395 | A1 | * | 8/2002 | Christensen | 707/104.1 |
| 2004/0165013 | A1 | * | 8/2004 | Nelson et al. | 345/858 |
| 2006/0242557 | A1 | * | 10/2006 | Nortis, III | 715/509 |
| 2006/0294199 | A1 | * | 12/2006 | Bertholf | 709/217 |
| 2007/0002689 | A1 | * | 1/2007 | Mateescu et al. | 367/73 |
| 2007/0196808 | A1 | * | 8/2007 | Call | 434/350 |
| 2007/0271157 | A1 | * | 11/2007 | Rosenberg | 705/28 |
| 2009/0119578 | A1 | * | 5/2009 | Relyea et al. | 715/234 |

OTHER PUBLICATIONS

Webopedia.com definition of 'hashing', Last updated Oct. 14, 2003.*

* cited by examiner

*Primary Examiner* — Sara England
(74) *Attorney, Agent, or Firm* — Osha Liang LLP

(57) ABSTRACT

Novel tools for navigating among a suite of business applications, including without limitaion menu systems for business application suites. In some cases, the menu is customized for a particular user of the business application suite. Hence, for example, a menu might comprise only items necessary to that user's job function and/or access level, as defined by one or more user roles that the user possesses. In another example, menu items may be provided only for actions that the user has appropriate permissions to take and/or pages that the user has appropriate permissions to view.

21 Claims, 9 Drawing Sheets

SUITE-WIDE NAVIGATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates in general software applications, and more particularly to navigation among applications in an enterprise software suite.

BACKGROUND OF THE INVENTION

Many software applications are offered as a "suite" of applications. A well-known example is Microsoft Office™, available from Microsoft Corp., which comprises, in various offerings, a word processor, a spreadsheet application, a presentation application, a database application, and/or other productivity applications. Another example of an application suite is an business application suite (also referred to herein as an "enterprise application suite," as a "suite of business applications" or simply as an "application suite," a "business suite" or an "enterprise suite"), which often will comprise applications to facilitate business management and decision-making at the enterprise level. Such "enterprise applications" (or "business applications") can include, without limitation, customer relations management ("CRM") applications, enterprise resource planning ("ERP") applications, supply chain management applications, and other applications dealing with various finance, accounting, manufacturing, and/or distribution functions, to name but a few examples. An exemplary enterprise application suite is the Oracle eBusiness Suite™, available from Oracle Corp.

In many cases, applications, and in particular, enterprise applications, are provided to users as client-server applications, in which the user operates a client at the user's local computer (usually a PC), while one or more server applications provide data for the client. Merely by way of example, in some cases, the client (or clients) for an enterprise application suite might be executed by and/or within a web browser (e.g., as Java applications), such that any PC with an appropriate web browser can be configured quickly and easily to operate as a client for one or more applications in an enterprise suite.

In addition, as modern software applications have evolved toward increasing interactivity among applications, developers have recognized a need to provide navigation tools to allow users to navigate between various applications within a suite, as several applications may be in use at any given time. Merely by way of example, some web-based enterprise suites offer a "navigator" page that allows a user to navigate between web pages associated with various applications within the suite. These navigator pages, however, are not ideal, since they require a user to navigate away from a given application to the navigator page in order to find a different application page.

Hence, there is a need for a more robust solution to provide navigation among various applications (and/or various components of an application) in a suite of business applications.

BRIEF SUMMARY

Embodiments of the invention therefore provide novel tools for navigating among a suite of business applications. Merely by way of example, particular embodiments provide menu systems for business application suites. In an aspect of some embodiments, a menu might be provided. In some cases, the menu is customized for a particular user of the business application suite. Hence, for example, in a particular aspect, a menu might comprise only items necessary to that user's job function and/or access level, as defined by one or more user roles that the user possesses. In another example, menu items may be provided only for actions that the user has appropriate permissions to take and/or pages that the user has appropriate permissions to view. In this way, navigation systems of the invention can provide more effective navigation for users by eliminating menu items for which a given user does not have permission and/or which are not relevant to the user's job role.

In an aspect of other embodiments, a menu system provides navigation without forcing the user to leave a particular business application screen to navigate to a table of contents page or a navigation tool. Instead, a menu can be provided at any location in a business application suite, for example, by providing an interface element (such as a button, hyperlink, etc.) to allow the user to invoke the menu at the appropriate time. In some embodiments, a menu comprises a plurality of menu items which are organized by hierarchy based, merely by way of example, on the function correlating to the menu item. In other cases, a particular menu item might invoke a subordinate menu, which may comprise subordinate menu items. In this way, for example, a menu item might correspond to a particular business function and, when selected, that menu item might cause the display of a subordinate menu, which would comprise a set of subordinate menu items corresponding to various tasks associated with that business function. In a particular aspect, the subordinate menus can be configured to display in such a way that they still allow the user to view the primary menu from which the subordinate menu was invoked.

Another aspect of certain embodiments provides menus with multiple columns. In an aspect, embodiments of the invention may be configured to calculate an ideal number of columns and/or an ideal number of items in each column (e.g., to most efficiently use screen real estate). In some cases, the preparation of the menu columns also takes into account the location of each menu item in the hierarchy of menu items. Menu column widths can also be dynamic to accommodate menu items with titles of varying lengths.

Various embodiments of the invention provide methods, computer systems and/or software that facilitate navigation in a business application suite. Mainly by way of example, a method might comprise one or more procedures, any or all of which are executed by a computer system. Correspondingly, the computer system might be configured to perform methods of the invention. Similarly, a computer program might comprise a set of instructions that are executable by a computer system (and/or a processor therein) to perform methods of the invention. In many cases, such software programs are encoded on computer-readable media.

For example, one set of embodiments comprises methods. An exemplary method provides a user interface for navigating among an application suite. This interface might be provided in a web browser, although other embodiments need not utilize web browser (and might, instead, for example, employ a dedicated client application and/or the like). The application suite might comprise a plurality of applications. The method, then, might comprise receiving a set of user credentials from a user and/or identifying a user based at least in part perhaps on a set of user credentials. A set of one or more user roles in the application suite can be identified for the user. In some cases, this identification is based, at least in part, on an identify of the user. In a set of embodiments, the method further comprises determining a set of user permissions for one or more of a plurality of applications, perhaps based at least in part on the identity of the user and/or an identified set of user roles.

In accordance with one embodiment, a master set of menu items for a plurality of applications can be obtained from a data store (such as a file system, database, and/or the like). The master set of menu Items might be organized in a hierarchy and/or arranged as a set of menu objects. In one implementation, each of the menu objects comprises one or more menu items. Accordingly, the method might include determining one or more menu objects that are available to the user, from the master set of menu objects. This determination may be based at least in part on the identified set of user roles and the one or more menu objects collectively may comprise plurality of menu items. This plurality of menu items can be aggregated into an array of displayable menu items, which might be based on a hierarchy in some cases. This array of displayable menu items might comprise one or more primary menu items and/or one or more subordinate menu items. In an aspect, each of the subordinate menu items corresponds to one of the primary menu items.

In some cases, the method includes preparing a set of one or more menu columns. Each of the menu columns might comprise one or more of the primary menu items. Further, a subordinate menu (and/or a set of subordinate menus, which might be cascading subordinate menus) might be prepared for a first primary menu item in a first menu column. This cascading subordinate menu may comprise a set of subordinate menu items corresponding to the first primary menu item. Finally, the method might include generating a menu comprising a set of one or more menu columns. This menu may be used for display in a web browser and the menu might comprise an interface element associated with the first primary menu item. When this interface element is selected and/or activated, the first cascading subordinate menu may be displayed.

In a particular set of embodiments, the method further comprises generating a web page comprising the menu. This webpage may be transmitted from a server computer (e.g., a web server in communication with an application server on which business applications execute, or perhaps the application server itself) to a user computer, which may be operated by the user. In an aspect, the web page might comprise an interface element that, when selected and/or activated, causes the menu to be displayed in the web page. Hence, the web page may be displayed in a web browser at the user computer and, in some cases, the method further comprises receiving (e.g., at the user computer and/or at the server computer) a selection of a menu item from the user. Based on that selection, another web page may be generated by one of the plurality of applications corresponding to the menu item. This other web page then can be transmitted to the user computer as well. This second web page may also include the menu.

Another exemplary method is a method of providing a user interface for navigating among an application suite. The application suite may comprise a plurality of applications, such as business applications, to name one example. The method might comprise obtaining a master set of menu items for the plurality of applications. The master set menu of menu items may be obtained from a data store. In an embodiment, the method further includes identifying, from the master set of menu items, a plurality of menu items that are available to a user, and/or aggregating the plurality of menu items into an array of displayable menu items. Further, one or more menu columns may then be prepared. Each of the menu columns might comprise one or more of the displayable items. A menu then can be generated; in an aspect, menu comprises the set of one or more menu columns.

Another method of providing user interface might comprise receiving a set of user credentials from a user. Based at least in part on the set of user credentials, the user can be identified and, based at least in part on the identify of the user, a set of one or more user roles in the application suite may be identified. The method, in some cases, further includes obtaining (e.g., from a data store) a master set of menu items for the plurality of applications. This master set may be organized in a hierarchy and/or arranged as a set of menu objects. Each of the menu objects might comprise one or more menu items. The method, then, can include determining one or more menu objects, from the master set of menu objects, that are available to the user. These one or more menu objects collectively comprise a plurality of menu items. This determination may be based, at least in part, on the identified set of user roles. A menu comprising at least some of the plurality of menu items then can be generated.

As noted above, another set of embodiments provides computer systems. An exemplary computer system comprises one or more processors, an application suite comprising a plurality of applications configured to execute on the one or more processors, and/or data store (e.g., a database, file system, etc. on some type of medium, such as a hard drive, etc.) in communication with the processor(s). The data store might comprise (e.g., have stored thereon) a master set of menu items for the plurality of applications. The computer may further comprise a computer-readable medium having embodied thereon a set of instructions which may be executable by the processor. The set of instructions might comprise, merely by way of example, instructions for obtaining, from the data store, the master set of menu items for the plurality of applications. The instructions might also include instructions for identifying a plurality of menu items that are available to the user. There may further be instructions for aggregating the plurality of menu items into an array of displayable menu items and/or for preparing a set of one or more menu columns, each of which might comprise one or more of the displayable menu items. In certain embodiments, there are further instructions to generate a menu comprising the set of one or more menu columns.

A further set of embodiments comprises articles of manufacture, specifically, tangible computer-readable media. Such media may have embodied thereon programs, including without limitation, programs for providing a user interface for navigating among an application suite. Such a program might include a set of instructions that are executable by one or more computers and/or computer processors.

In an exemplary embodiment, the set of instructions might comprise instructions for receiving a set of user credentials from a user and/or instructions for identifying a user. This identification may be based at least in part on the set of user credentials. In some cases, the program further comprises instructions for identifying a set of one or more user roles in the application suite for the user, based at least in part, perhaps, on an identity of the user. There may be further instructions for obtaining (e.g., from a data store) a master set of menu items for the plurality of applications. The master set of menu items may be organized in a hierarchy and/or arranged as a set of menu objects, each of which might comprise one or more menu items. There may be further instructions for determining one or more menu objects that available to the user from the master set of menu objects. These one or more menu objects collectively might comprise of plurality of menu items and the software program may include instructions for generating menu comprising some of the plurality of menu items. In some cases the application suite itself might comprise the program.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1A:
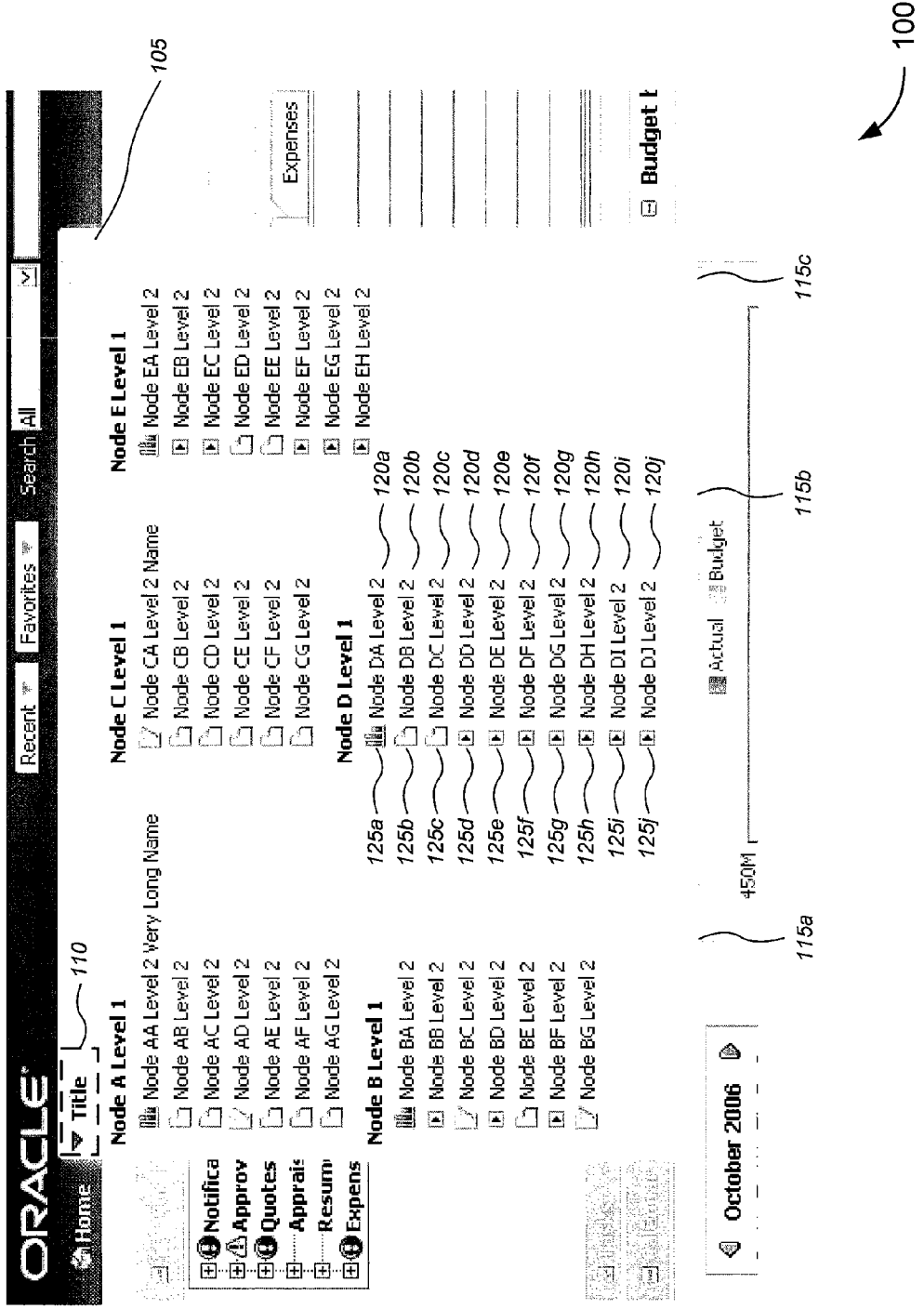
FIGS. 1A-1C illustrate screen displays of a business application suite employing a navigation tool, in accordance with various embodiments of the invention.

Various embodiments of the invention provide novel tools for navigating among a plurality of applications in a business application suite. As used herein, the term "business application suite" should be interpreted broadly to mean any set of applications that are used to perform business functions. Such application suites can include applications such as customer relations management ("CRM") applications, enterprise resource planning ("ERP") applications, supply chain management ("SCM") applications, warehouse management ("WM") applications, and the like. It should be noted that the term "plurality of applications" is used in a non-limiting sense. For example, in some cases, each of the plurality of applications might be a standalone application that can be employed within a suite of applications. In other cases, however, the plurality of applications might comprise a plurality of components, tasks, functions, and/or the like, which do not have standalone functionality. Such applications might, for example, be incorporated within a single application framework. Merely by way of example, in the enterprise context, an enterprise application suite might comprise applications for various tasks, such as SCM, WM, CRM, general ledger accounting and/or the like. Irrespective of whether these applications can function as standalone applications or are implemented as components within a single enterprise application, they still should be considered a plurality of applications, as that term is used herein.

In many cases a business application suite will combine two or more such applications in order to provide generalized control over some or all of the business functions of an enterprise. The interrelation of such applications facilitates the management of an organization's business processes, but it can present issues for users when trying to navigate among the many functions of such applications. Hence, certain embodiments of the invention provide tools to facilitate the navigation among applications, and/or functions of those applications, within a business suite.

One skilled in the art will appreciate, based on the disclosure herein, that business application suites (and/or the applications themselves) can be presented to users in a variety of ways, and that users, correspondingly, can interact with business applications and suites in a variety of ways. Merely by way of example, many modern business application suites run on application servers and are served to a user either through a web interface, such that a user uses a web browser to interact with a business application. Alternatively and/or additionally, interaction with a business application and/or suite might be provided through a dedicated client interface in which the user uses a dedicated client to interact with the application. Embodiments of the invention can be used in both of these environments, as well as others. Merely by way of example, some embodiments of the invention provide web-based menu systems that reside in web pages served by an application server and/or web server that is running a business application. Alternatively, other embodiments of the invention are configured to be used within a dedicated client application. In addition, as noted above, there are many other ways in which data can be presented to a user from an application, and various embodiments of the invention can be used in any such environment.

Turning to FIG. 1A, as screen display of a business application suite 100 is illustrated. In the illustrated environment the screen display is from a web browser although as noted above there are embodiments that might employ other dedicated clients or other facilities for providing screen displays. In certain embodiments, the business application suite 100 includes a navigational tool. One example of such a tool is the menu 105 of FIG. 1A. Other various other embodiments might employ different navigational tools within the scope of the invention. In an aspect, the menu 105 can be invoked from a web page through use of an interface element, which is indicated by reference number 110 on FIG. 1A and highlighted by broken lines. This interface element 110 can be activated, for example, by selecting (clicking on) an icon with a mouse, by use of a keyboard, etc,., and when activated, the interface element 110 will cause the display of the menu 105 (as illustrated in FIG. 1A, for example). In some embodiments, by activating the interface element 110 a second time, the user can terminate the display of the menu 105. In other embodiments the display of menu 105 can be terminated by selecting a menu item and/or through other appropriate procedures.

Menu 105, as displayed by FIG. 1A, includes three menu columns 115. Each menu column contains one or more menu items, including merely by way of example, the menu items 120 illustrated in column 115 of FIG. 1A. Generally, each menu item 120 will have a label indicating the purpose of that menu item (visually, the menu item 120 might be considered to be the label itself). In an aspect of some embodiments, a column 115 can have a dynamic width. Thus, for example, the width of a column might correspond to the length of the longest label for any menu item 120 in that column. This is illustrated on FIG. 1A, for example, by columns 115a and 115b. Because column 115a has a menu item with a relatively longer label than any of the menu items in column 115b, column 115a is wider than column 115b. In an aspect of other embodiments, the menu items in various columns can be arranged according to a hierarchy as described in further detail below. In this way, menu items associated with similar functions (e.g., menu items associated with a particular business application and/or function, with a particular job function, and/or the like) can be grouped together on the menu 105 to provide more efficient navigation of the menu 105. In one set of embodiments, each menu item 120 may have associated therewith a menu item type identifier 125a which can be used to indicate a type of the menu item. Merely by way of example, some menu items may be used to navigate to various input screens in which users can provide input to a business application while other menu items might be used to navigate to screens that merely display information for a user. Hence, for example, type identifier 125a associated with menu item 120a might indicate that menu item 120a is associated with a page that merely displays information while type identifier 125b which is associated with menu item 120b might indicate that menu item 120b navigates to a page where a user can provide input.

In certain embodiments menu items can be categorized as either primary menu items or subordinate menu items. In some cases a primary menu item is a menu item that is displayed on the menu 105, while a subordinate menu item is displayed in a subordinate menu, as described, for example, in further detail below. In the illustrated embodiment, a primary menu item 120d that is used merely to invoke a subordinate menu has a particular type of menu item type identifier 125d to indicate to the user that that menu item, rather than navigating into a separate page, will simply invoke its subordinate menu.

Figure 1B:
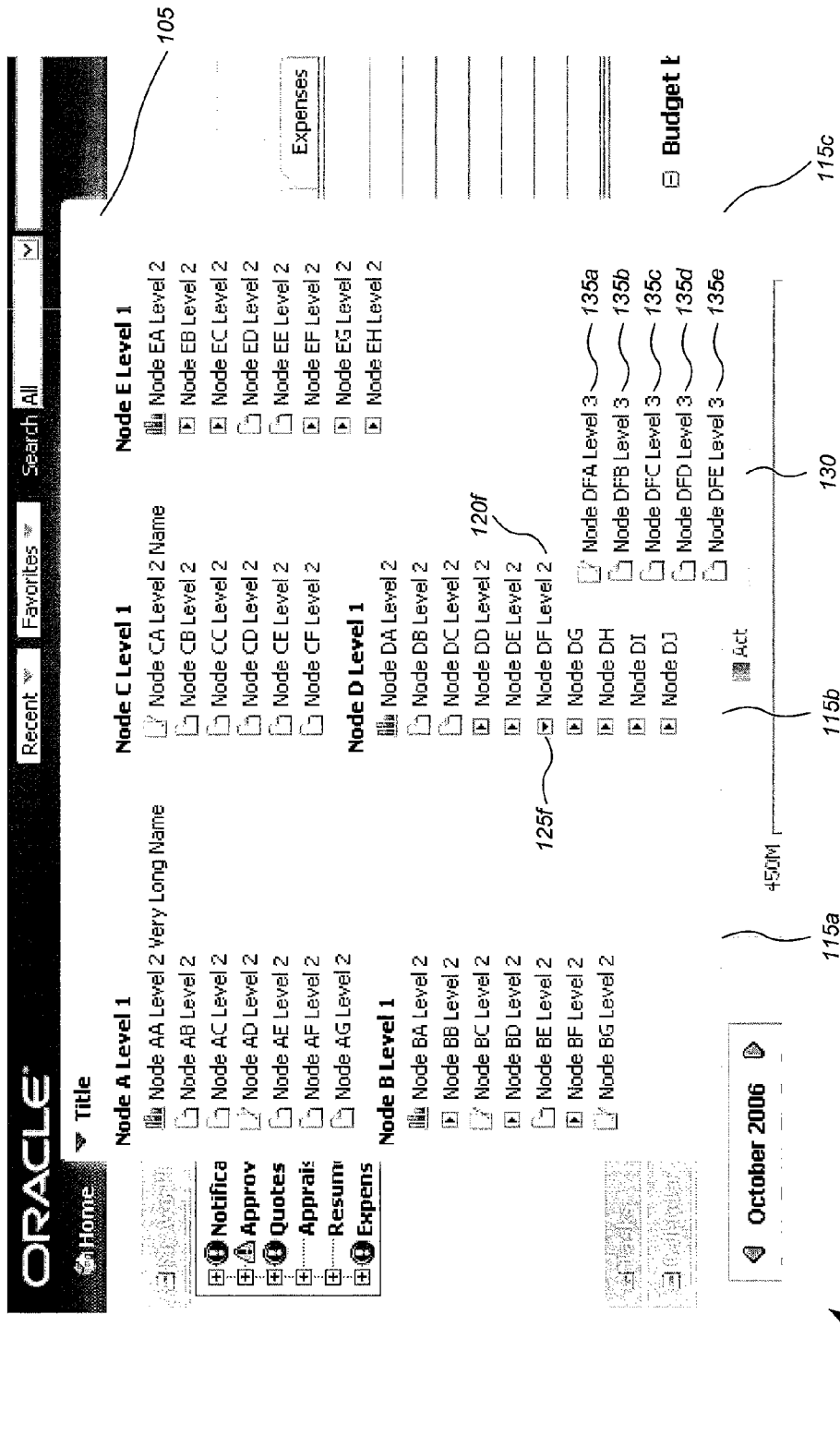

The operation of such a menu item is illustrated by FIG. 1B, which depicts the business application 100, including the menu 105. In FIG. 1B, a menu item 120f has been activated (selected). In a set of embodiments, a menu item can be activated by activating (selecting) an interface element associated with that menu item. In some cases, the interface element associated with a menu item might be the label of the menu item itself (e.g., the text of the menu item might be a hyperlink). In other embodiments, the interface element might be the type identifier 125 (which might be implemented as a button, etc.) associated with a particular menu item. In such cases, when the text of the menu item itself is selected the business application 100 might simply navigate to a separate page associated with that menu item, while when the type identifier 125 is selected the business application 100 might produce a subordinate menu. In yet other cases, both the text of the menu item 120 and the menu item type identifier 125 can serve as the interface element to cause the display of a subordinate menu.

Hence, FIG. 1B illustrates the selection of an interface element corresponding to a menu item 120f, which has produced a subordinate menu 130. The subordinate menu 130 contains a plurality of menu items 135. In an aspect, as noted above, each of the menu items 135 may be related in some fashion to the primary menu item 120f that is used to trigger the subordinate menu 130 of which they are a part. Merely by way of example, the primary menu item 120f might correspond to a job function such as "accounts receivable," and the subordinate menu items might correspond to particular tasks within that job function, such as "view accounts aging," "view past invoices," and/or the like.

As illustrated by FIG. 1B, in a particular embodiment, the menu 105 is displayed in a first layer, while the subordinate menu 130 is displayed in a second layer on top of the first layer, such that the subordinate menu 130 is displayed "over" the menu 105. In an aspect, however, subordinate menus 130 are configured to be displayed so that they do not completely obscure the menu 105 and/or the menu column 115b that contains the menu item 120f that triggered the subordinate menu 130. In this way, for example, a user can view not only the subordinate menu 130 but also at least a portion of the menu 105 (including, in the illustrated example, the menu item 120f with which it is associated, as well as other menu items on the menu 105 and/or in the menu column 115b). This feature can provide for enhanced navigation for users, because the selection of a subordinate menu 130 does not prevent the user from seeing the remainder of the menu 105 and/or column 115b, thereby allowing the user to easily and quickly return to the menu 105 and/or select another menu item 120 (for example, by selecting a particular menu item 120) while the subordinate menu 130 is still displayed), if the desired action does not correspond to any of the menu items 135 on the subordinate menu.

Figure 1C:
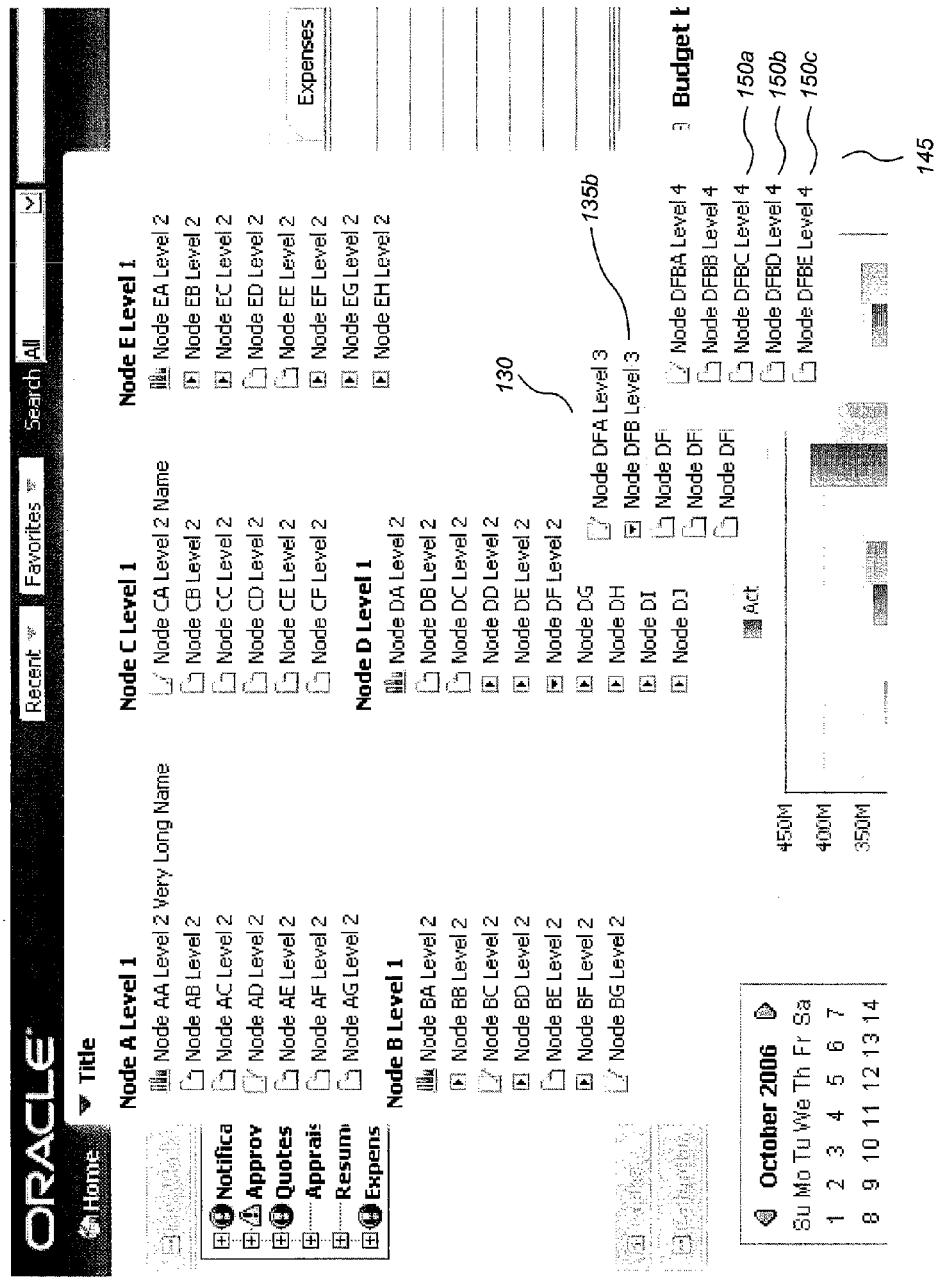

Certain embodiments feature cascading subordinate menus (i.e., a subordinate menu containing a menu item that itself has a corresponding subordinate menu). This functionality is illustrated by FIG. 1C, in which an interface element associated with menu item 135b has been selected to display a second subordinate menu 145 comprising a plurality of menu items 150. Hence, in some cases, a subordinate menu item 135b may also have additional menu items 150 that are subordinate to a subordinate menu item 135b.

Figure 2:
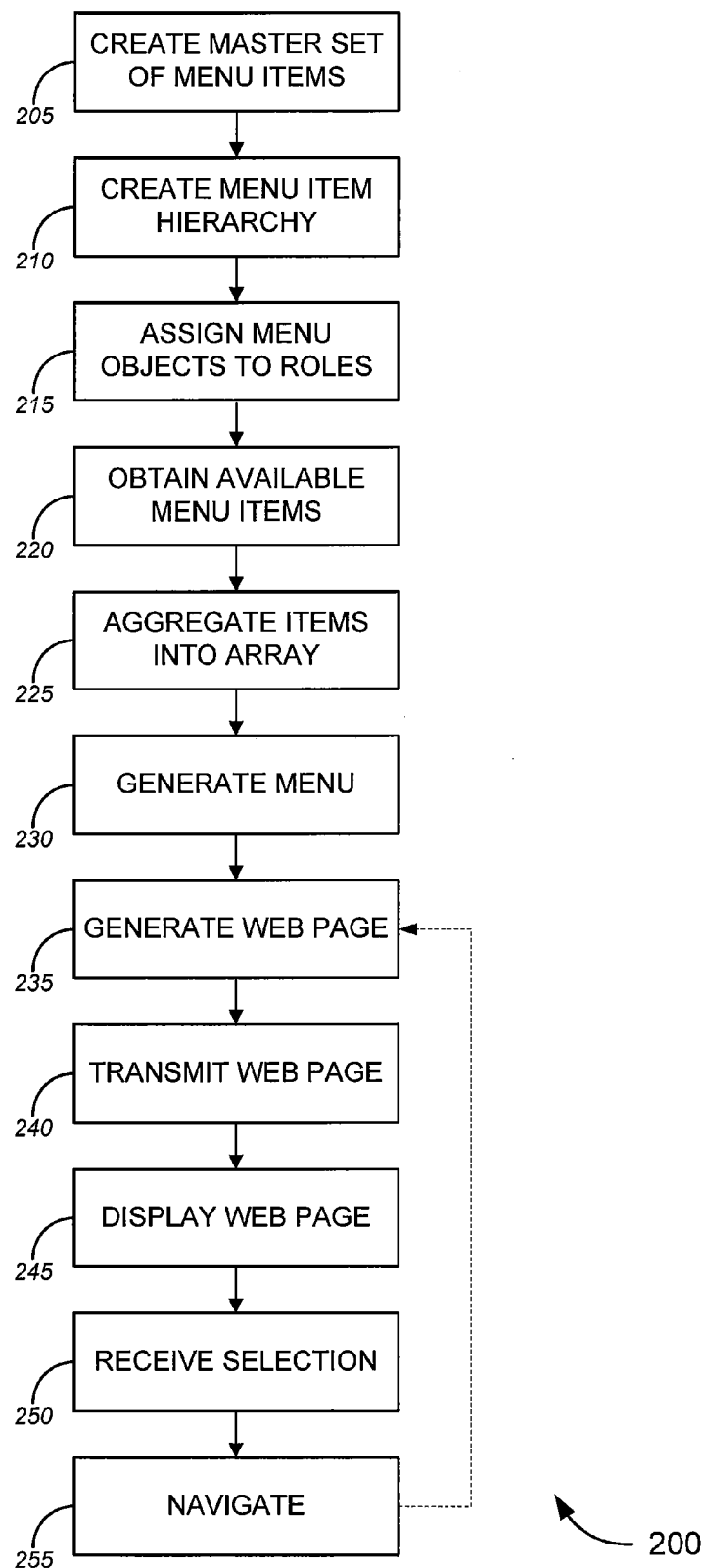
FIG. 2 is process flow diagram illustrating a method of providing navigation among a suite of business applications, in accordance with various embodiments of the invention.

FIG. 2 illustrates a method 200 of providing a user interface for navigating among an application suite. In particular embodiments, the method 200 can be used to provide a navigation tool, such as the menu 105 described with respect to FIGS. 1A-C above, and/or to allow a user to navigate through application functions using such a menu. As described in further detail below, the method 200 can be performed at least in part by a computer system with appropriate software and/or can be included in a software program as a set of instructions to be performed by a computer system. In a set of embodiments, such instructions may be included (e.g., as a program component) within a business application suite. In other embodiments the set of instructions may be part of a program separate from and/or additional to a business application suite.

In one set of embodiments, the method 200 comprises creating and/or maintaining a master set of menu items (block 205) The master set of menu items can be thought of as a global collection of all menu items that are available to all users at all permission levels within the suite of business applications. Hence the master set of menu items will generally comprise menu items associated with functions or tasks that correspond to many if not all of the business applications within the business application suite.

At block 210, a menu item hierarchy is created and/or maintained (block 205). A menu item hierarchy can be used to establish a relationship among a plurality of menu items that can be used on a menu, such as the menu 105 described. The hierarchy can be applied to the master set of menu items and/or to a subset thereof. Merely by way of example, in some cases, a menu item hierarchy may indicate which menu items are primary menu items and which menu items are subordinate menu items. In this way for example, it can be ascertained whether a particular menu item should reside on a menu or alternatively on a subordinate menu. Additionally and or alternatively, the menu item hierarchy can be used to specify the user roles and/or permissions required to access menu items within a particular segment of the hierarchy. (In other cases, however, these requirements might be expressed outside of the menu item hierarchy.) Hence, for example, a menu item hierarchy might indicate that a first set of menu items should be displayed for a user having a particular user role and/or only accessible by users having any particular level of permission.

In an aspect of some embodiments, menu items may be organized into one or more menu objects. In an aspect, a menu object can be thought of as a menu component that can be used to build menu, which might comprise menu items from a plurality of menu objects. A menu object generally comprises a plurality of menu items, all of which have some relationship (based on, for example, tasks related to a user role associated with the menu object, tasks associated with a particular business application in the suite, etc. Merely by way of example, a menu object for an accounting function might have menu items corresponding to an accounts payable task, an accounts receivable task, a general ledger task, and/or the like. In some cases, the menu objects are specified by the menu item hierarchy. In other cases, menu objects may be separate from a menu item hierarchy and/or a menu item hierarchy may not be provided.

In a set of embodiments, a business application and/or suite will provide user roles to allow for enhanced convenience and/or flexibility in administering user privileges and user functions. Merely by way of example, a user may have a user role as manager, which might give that user permissions to view human resources data for other employees for whom that user is a manager and/or might allow or require that user to perform certain functions within one or more business applications related to that management position. As another example, a user might have a user role of accounting which would require the user to have access to various accounting functions provided by on or more of the business applications in the suite.

Accordingly, embodiments of the invention allow for menu items (and/or, more particularly, menu objects) to be assigned to various user roles. In particular embodiments one or more user roles might correspond to the plurality of menu objects. Similarly, a particular menu object might correlate to one or more user roles. Hence, at block 215, the method 200 comprises assigning one or menu objects to a user role. In this way, as described in further detail below, if a user has a particular user role, some or all of the menu items within a menu object assigned to that role should be available to the user.

At block 220, the method 200 comprises obtaining available menu items to be displayed with a navigation tool in accordance with embodiments of the invention. In a set of embodiments, obtaining available menu items might comprise selecting one or more menu items from the master set of menu items according to various selection criteria. One such criteria is the identity of the user for whom the navigation tool will be displayed and/or any roles and/or permissions associated with that user.

Figure 3:
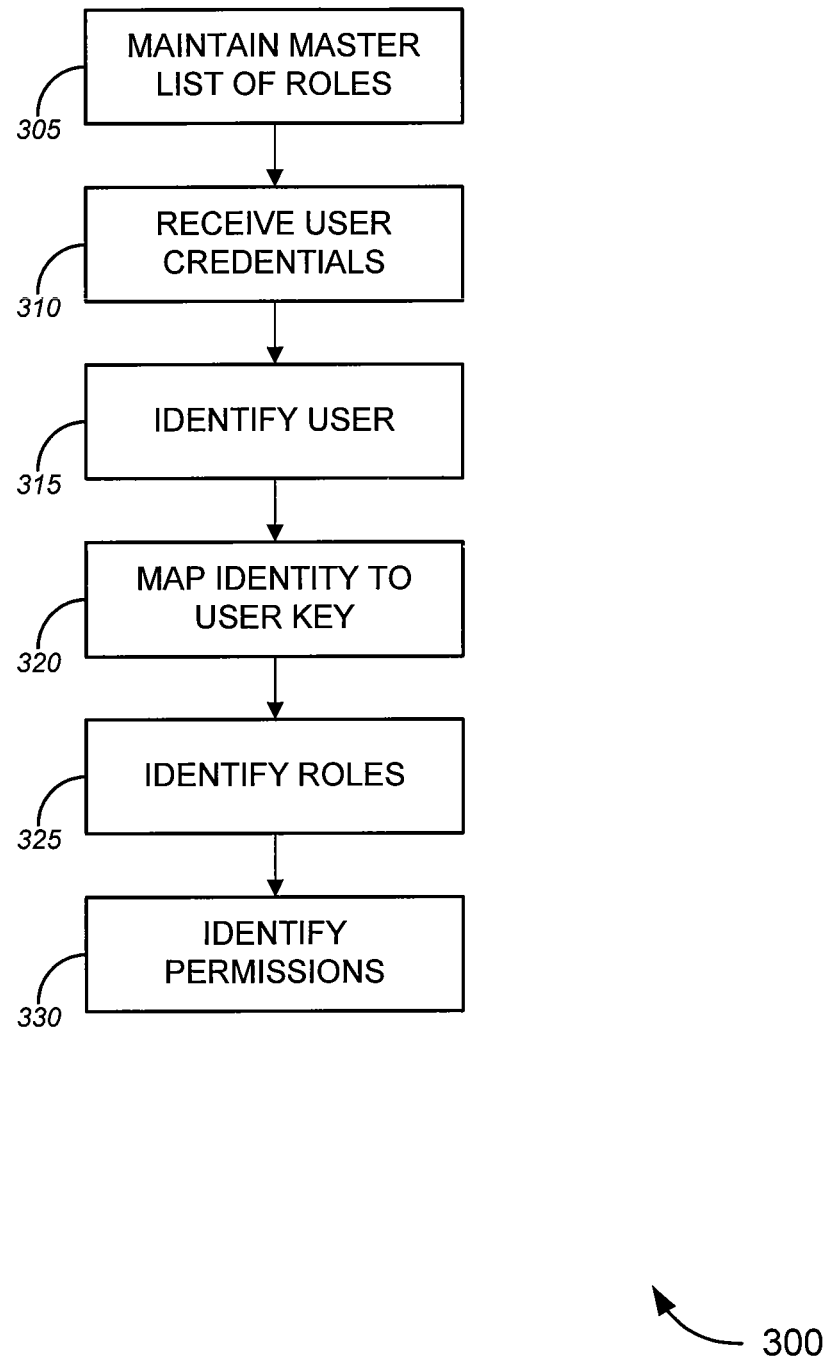
FIG. 3 is a process flow diagram illustrating a method of identifying a user, in accordance with various embodiments of the invention.

Accordingly, with reference to FIG. 3, a method 300 of identifying a user might comprise maintaining a master set of user roles (block 305). A master set of user roles can be used to define all of the available user roles within the business application suite. As noted above, there are many different possibilities for types of user roles, including without limitation user roles related to a particular user's job function, user roles related to a particular user's position within an organizational structure, user roles related to a particular user's need for access to information provided by the business applications and/or the like (at block 310). In some cases, each role in the master set of roles is associated with a role key. This role key can be used to uniquely identify the role within the business application suite.

At block 310, user credentials are received. There are many ways that user credentials may be received in accordance with various embodiments in the invention. Merely by way of example, in some cases a user may be required to login (e.g., with a userid and/or password) to one or more of the business applications in the suite of business applications, or to the suite itself. Alternatively and/or additionally, single signon capabilities may be used; for example, when the user logs on to a network and/or an operating system for the user's computer, those credentials can be passed to the business application suite and/or the applications therein. In any event, once the user's credentials have been received, the user is identified based on those credentials (block 315). There are many ways known to one skilled in the art of identifying a user based on received user credentials and any of such ways may be used in accordance with various embodiments of the invention.

At block 320, the user's identity is mapped to a user key, which, in accordance with some embodiments of the invention, can be any value that is unique to that user (vis-à-vis other users) within the business suite. Based on the user identity (and/or more specifically in some cases the user key), one or more user roles for that user can be identified (block 325). Merely by way of example, in some cases a table, might correlate each user key with one or more user roles (perhaps as identified by role keys) from the master set of roles. By performing a lookup on this table, the roles associated with a particular user key can be identified. Furthermore, in some cases, the permissions for a particular user can be identified as well (block 330), based on the roles themselves, on a separate access control list, and/or the like. Hence, in some embodiments, the permissions for a particular user correlate to the roles that that user possesses, while in other embodiments, the permissions for user are independent from that user's roles. One skilled in the art will appreciate, based on the disclosure herein, that there are a variety of ways to maintain user permissions for a business application suite, any of such methods may be used in accordance with the embodiments of the invention. As noted above, user permissions are used to define what actions a particular user can take within a business application suite and/or what data that user might have access to, among other things.

Figure 4:
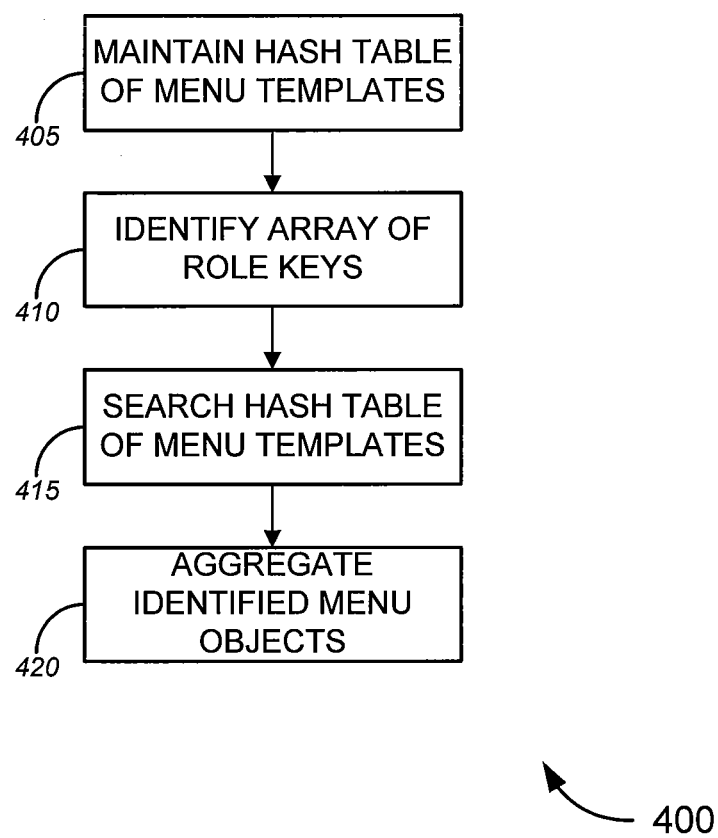
FIG. 4 is a process flow diagram illustrating a method of determining a set of displayable menu items for a user, in accordance with various embodiments of the invention.

As noted above, in some cases the menu items that available for display to a particular user are dependent on that role(s) possessed by that user. FIG. 4 illustrates one method 400 of identifying menu items for a user based on the role(s) that the user possesses. The method 400 comprises maintaining a hash table of menu templates (block 405). The hash table of menu templates comprises a correlation between each role key and a menu template for that role key. In an embodiment, the associations in the menu template hash tables are based on the assignment of particular menu objects to roles, as described above.

A menu template comprises one or more menu objects that should be associated with that role. (In an alternative embodiment, each menu object might itself be considered a menu template, and the hash table might correlate menu objects directly with user roles to which they are assigned.) Thus, for example, a role key for an accounting role might have associated therewith (e.g., in the menu template hash table) a menu template comprising two menu objects: The first menu object might be an accounting menu object that comprises menu items such as accounts payable, accounts receivable, etc., and a budgeting menu object that comprises items such as create budget forecast, review budget forecast, etc.

In some implementations, a menu template comprises one or more menu objects themselves. In another set of embodiments, the menu template might simply comprise an identifier of each menu object that the menu template comprises. So therefore, the hash table of menu templates may comprise, for each role key, a menu template that is a list of menu objects that should be associated with that role key.

At block 410, a method 400 comprises identifying an array of role keys that are associated with the user key. As noted above at block 325, as discussed in FIG. 3, a user key can be used to identify one or more roles for that user. Similarly, once the roles have been identified, the role keys using those roles can be obtained from the master list of roles (and/or might be obtained as part of the process identifying roles for the user). Merely by way of example, a table may correlate a user key with each of the role keys that corresponds to that user and identifying the array of role keys can comprise simply looking up the user key and the table to identify the array of role keys.

At block 415, the hash table of menu templates is searched to find a menu template that corresponds with one of the user's role keys. This process can be performed iteratively if there are a plurality of role keys associated with the user. So, for example, if a user has a manager role and an accounting role, the method 400 might comprise first searching the hash table for a menu template associated with the manager role key, and then searching the hash table a second time for a menu template associated with the accounting role key. This search generally will produce a set of one or more menu templates that collectively correspond to the user's roles. As noted above, these menu templates comprise and/or identify one or more menu objects. Hence, by searching the hash table of menu templates, the method 400 can be used to determine one or more menu objects that are available to the user, based on that user's roles. Also as noted above, each menu object will generally comprise one or more menu items, which can be considered menu items that are available to the user based again on the user's roles. (In some cases, all of the menu items in an identified menu object will be available to a user. In other cases, some subset of the menu items in the menu object will be available to the user, based, for example, on the user's permissions in the business application suite.) Once these menu objects have been determined, they can be aggregated block 420. By aggregating the menu objects (and by extension, the menu items that those menu objects contain), the method 400 effectively aggregates each of the menu items from those menu objects into an array of displayable menu items.

Figure 5:
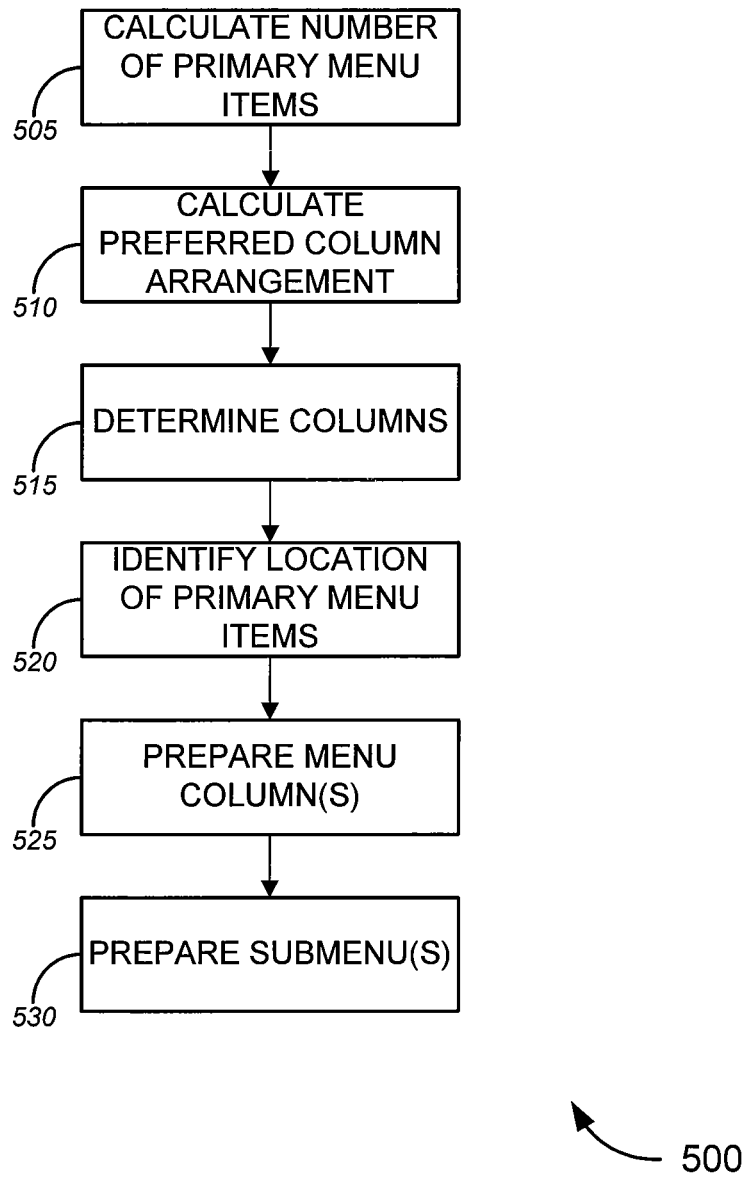
FIG. 5 is a process flow diagram illustrating a method of preparing a menu, in accordance with various embodiments of the invention.

Once the menu items available for display to the user have been aggregated, a menu can be generated from those displayable menu items (block 230). FIG. 5 illustrates a method 500 of generating a menu in accordance with one set of embodiments. It should be noted, however, that other processes can be used to generate menus in accordance with other embodiments of the invention. In a general sense, the method 500 comprises preparing a set of one or more menu columns for the menu, preparing any necessary subordinate menus, each of which comprise a set of subordinate menu items associated with the primary menu item in one of the menu columns, and then generating the menu based upon the menu columns and/or the subordinate menus.

A detailed illustration of this process in accordance with one set of embodiments is illustrated by FIG. 5. At block 505, the method 500 comprises calculating a number of primary menu items. Generally, this procedure comprises summing the number of menu items from each of the identified menu objects to arrive at a total number of primary menu items that should be displayed on the menu. At block 510, a preferred column arrangement is calculated. In a set of embodiments, the preferred column arrangement comprises a preferred number of menu columns and/or a preferred column height of each of the menu columns. In many cases, this preferred column arrangement can be calculated based on the available amount of screen real estate for the menu.

Once the preferred column arrangement has been calculated, one or more menu columns are determined (block 515), based, in some cases, on the number of primary menu items and the preferred column arrangement. In other words, based on the number of primary menu items be displayed and the preferred column arrangement, a number of columns for the menu can be determined. Merely by way of example, if there are fifteen primary menu items to be displayed, and the maximum column height is five menu items, it might be determined that there should be three menu columns, assuming that the preferred column arrangement can accommodate three menu columns of five menu items each. Once the columns have been determined, the method 500 comprises identifying a location in one of the menu columns for each of the primary menu items (block 520). The identification of a location for a particular menu item can be based on that menu item's membership in a particular menu object and/or based on the hierarchy of the master set of menu items. Merely by way of example, in many cases all of the displayable menu items from a particular menu object will grouped together because they may be functionally related such that grouping them together on a menu facilitates efficient navigation by the user. Once the location of each of the primary menu items has been identified, the menu columns can be prepared (block 525), for example, by placing the menu items in their respective positions in the menu columns.

If there are any subordinate menu items, a submenu can be prepared to hold those subordinate menu items (block 530). As noted above, in an aspect of some embodiments each subordinate menu item is associated with a primary menu item and/or with another subordinate menu item. Therefore, in preparing a submenu, all of the subordinate menu items that are associated with a particular primary menu item are placed into subordinate menu that is associated with that menu item. As illustrated, for example, by FIG. 1B, above. This process can be performed iteratively if there are cascading submenus (i.e., if a first submenu contains a menu item that has additional subordinate menu items that should be placed in an additional submenu).

It should be noted that a menu may be prepared (e.g., as described with respect to FIG. 5) without actually displaying a menu to a user. Rather, the preparation of a menu might comprise generating the display code (such as hypertext markup language, stylesheets, and/or the like in the case of a web-based menu), which can then be provided in a web page.

Accordingly, referring back to FIG. 2, the method 200 may comprise generating a web page (block 235). As one skilled in the art will appreciate, there are a number of ways to generate web pages in an application suite, and any of these procedures can be used in accordance with various embodiments of the invention. Merely by way of example, a business application running on an application server can be used to generate dynamic web pages for displaying screens associated with that business application. In an aspect, the generated web page will comprise the generated menu, as illustrated, for example, by FIGS. 1A-1C. After the web page has been generated, it may be transmitted to a user computer (block 240) in a conventional fashion (e.g., via HTTP from a web server over the Internet or an intranet, etc.), where it is displayed for a user (block 245). Merely by way of example, the web page may be transmitted to a web browser on a user's computer and/or the web browser may be used to display the web page. As noted above, in some cases, the menu is not displayed by default on the web page, rather when the user desires to view the menu the user can activate an interface element in order to have the menu displayed.

In some embodiments, the method 200 comprises receiving a selection of a menu item from the user (block 250). In some embodiments, the method comprises navigating to a display screen referenced by the selected menu item (block 255). Merely by way of example, a menu item might correspond to a function in a particular application, and upon selection of that menu item, the method might comprise navigating to an input screen produced by that application for receiving input, from the user, related to that function. In a particular embodiment (for example, if the menu is provided in a web page, a second web page may be generated based on the selection, and/or transmitted for display for the user. (Alternatively, if the selected menu item is associated with a submenu, selection of that menu item might simply cause the display of the submenu, as described in detail above.) The second web page generally will correspond to the menu item selected by the user. In many cases the second web page will also comprise the menu, which would allow the user to select yet another web page based on a menu item in the menu. In this way embodiments of the invention provide the ability for a user to navigate among various applications, tasks and/or functions within a business application suite.

Figure 6:
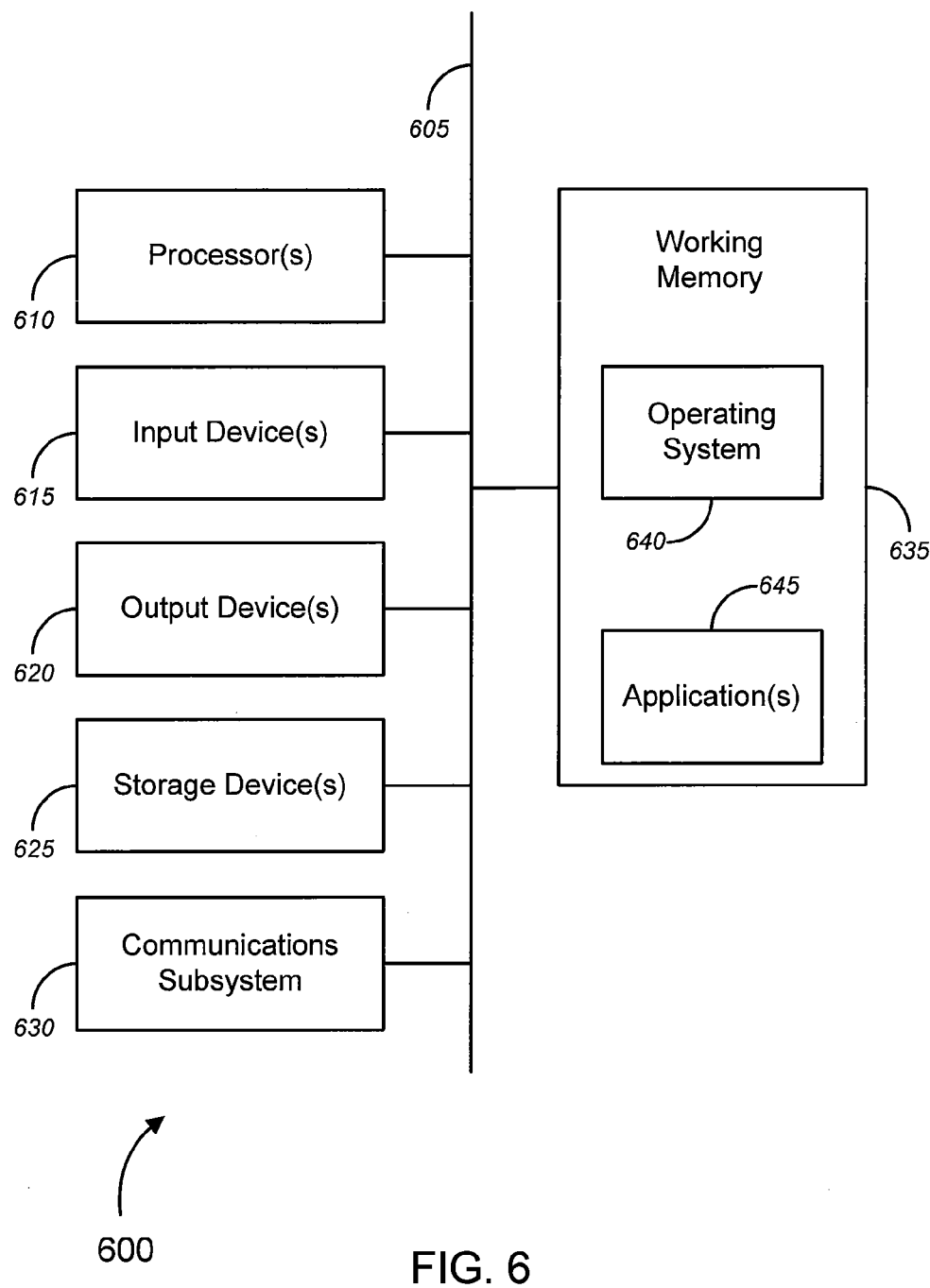
FIG. 6 is a generalized schematic diagram illustrating a computer system that can be employed in various embodiments of the invention.

FIG. 6 provides a schematic illustration of one embodiment of a computer system 600 that can perform the methods of the invention, as described herein, and/or can function as a client (user computer) and/or server computer, as described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can electrically coupled via a bus 605 (or may otherwise be in communication, as appropriate). The hardware elements can include one or more processors 610, including without limitation one or more general-purpose processors and/or one or more special-purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 600 might also include a communications subsystem 630; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 630 may permit data to be exchanged with a network (such as the network 610 described below, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640 and/or other code, such as one or more application programs 645, which may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), such that the storage medium can be used to program a generic computer with the instructions stored thereon. These instructions might take the form of executable code, which is executable by the computer system 600 and/or might take the form of installable code, which, upon installation on the computer system 600 (e.g., using any of a variety of generally available installation programs, compression/decompression utilities, etc.) then takes the form of executable code.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In one aspect, the invention employs a computer system (such as the computer system 600) to perform methods of the invention. According to a set of embodiments embodiment, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 causes the processor(s) 610 to perform one or more procedures of the methods described herein.

The term "machine-readable medium" as used herein refers to any medium that participates in providing data that causes a machine to operation in a specific fashion. In an embodiment implemented using the computer system 600, various machine-readable media might be involved in providing instructions to processor(s) 610 for execution. In many implementations, a machine-readable medium is a physical and/or tangible medium. Such a medium may take many forms, including but not limited to, non-volatile media, volatile media, and transmission media. Non-volatile media includes, for example, optical or magnetic disks, such as the storage device(s) 625. Volatile media includes, without limitation dynamic memory, such as the working memory 635. Transmission media includes coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves, including without limitation radio, acoustic and/or light waves, such as those generated during radio-wave and infra-red data communications.

Common forms of physical and/or tangible machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to the processor(s) 610 for execution. Merely by way of example, the instructions may initially be carried on a magnetic disk and/or optical disc of a remote computer. The remote computer might load the instructions into its dynamic memory and send the instructions as signals over a transmission medium. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
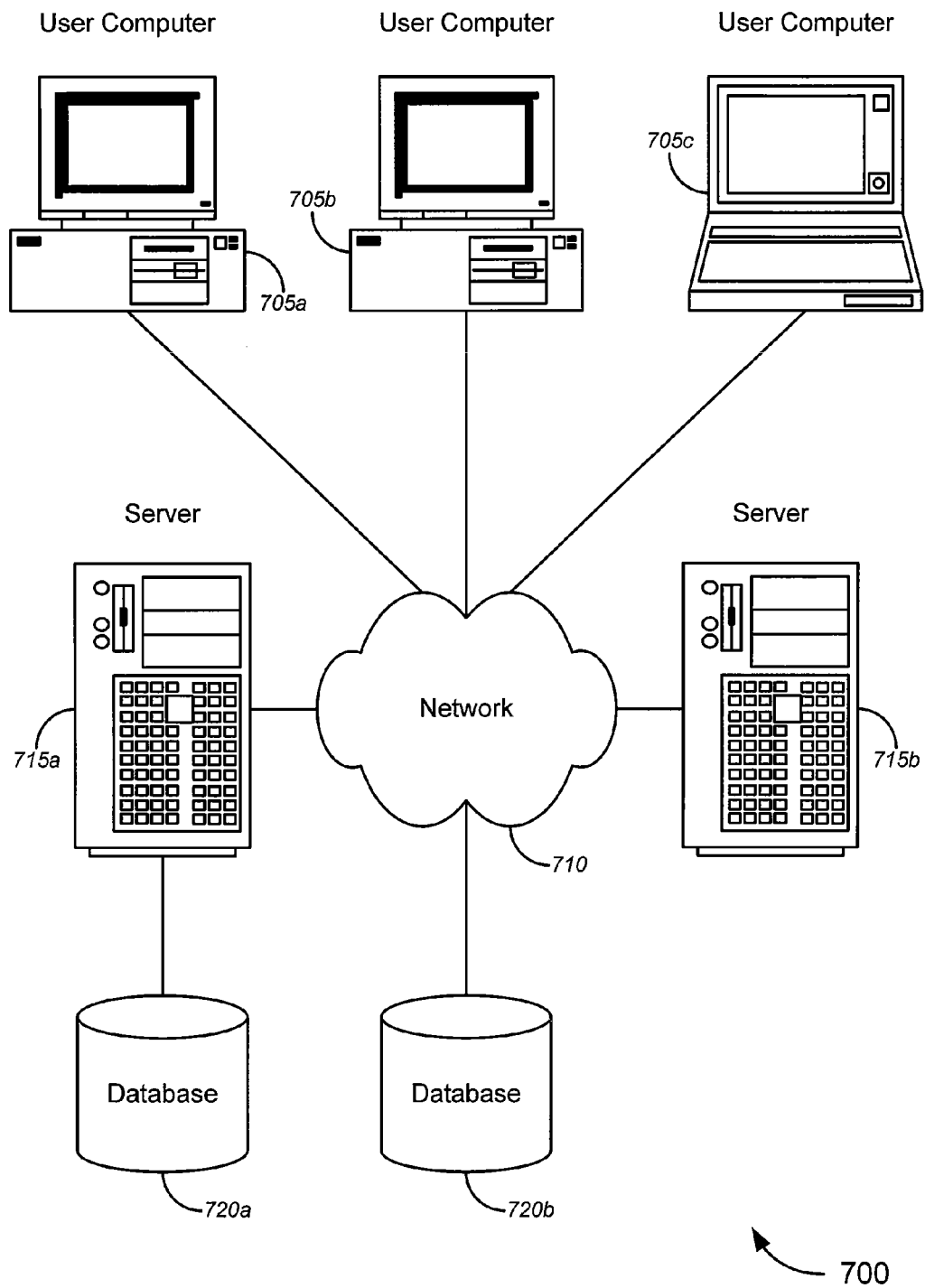
FIG. 7 is a block diagram illustrating an exemplary networked computer system that can be employed in various embodiments of the invention.

A set of embodiments comprises systems for providing navigation among a business application suite. In many cases, a business application suite will provided to a client (user computer) by a server computer, via a network. Merely by way of example, FIG. 7 illustrates a schematic diagram of a system 700 that can be used in accordance with one set of embodiments. The system 700 can include one or more user computers 705. The user computers 705 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 705 can also have any of a variety of applications, including one or more applications configured to perform methods of the invention, as well as one or more office applications, database client and/or server applications, and web browser applications. Alternatively, the user computers 705 can be any other electronic device, such as a thin-client computer, Internet-enabled mobile telephone, and/or personal digital assistant, capable of communicating via a network (e.g., the network 710 described below) and/or displaying and navigating web pages or other types of electronic documents. Although the exemplary system 700 is shown with three user computers, any number of user computers can be supported.

Certain embodiments of the invention operate in a networked environment, which can include a network 710. The network 710 can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 715. Each of the server computers 715 may be configured with an operating system including without limitation any of those discussed above, as well as any commercially-available server operating systems. Each of the servers 715 may also be running one or more applications, which can be configured to provide services to one or more clients 705 and/or other servers 715.

Merely by way of example, one of the servers 715 may be a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one ore more file and or/application servers, which can include one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 705 and/or another server 715. In some embodiments, an application server can create web pages dynamically for displaying the information in accordance with embodiments of the invention, such as web pages associated with a business application, which might comprise a menu and/or other navigation tools, such as those described in detail above. Data provided by an application server may be formatted as web pages (comprising HTML, Javascript, etc., for example) and/or may be forwarded to a user computer 705 via a web server (as described above, for example). Similarly, a web server might receive web page requests and/or input data from a user computer 705 and/or forward the web page requests and/or input data to an application server.

In accordance with further embodiments, one or more servers 715 can function as a file server and/or can include one or more of the files necessary to implement methods of the invention incorporated by an application running on a user computer 705 and/or another server 715. Alternatively, as those skilled in the art will appreciate, a file server can include all necessary files, allowing such an application to be invoked remotely by a user computer 705 and/or server 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 735 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of providing, in a web browser, a user interface for navigating among an application suite comprising a plurality of applications, the method comprising:

receiving a set of user credentials from a user;

identifying the user, based at least in part on the set of user credentials;

identifying a plurality of user roles in the application suite for the user, based at least in part on the identity of the user;

identifying a type of each application of a subset of applications of the plurality of applications within the application suite, wherein the subset comprises applications to which the user is credentialed to access, wherein the type identifies one or more attributes of the application;

determining a set of user permissions for one or more of the plurality of applications, based at least in part on the identified plurality of user roles;

providing a web page to a web browser for the user to interact, the web page having a user interface element, the user interface element being based, at least in part, on one of the plurality of applications;

invoking a customized menu for the identified user to be displayed in response to a first user input selecting the user interface element;

generating the customized menu for the identified user, the customized menu comprising aggregated menu items particular to functions of the plurality of applications, each menu item respectively associated with a particular function and with a particular application of the plurality of applications, the generating comprising:

aggregating menu items particular to the functions of the plurality of applications based at least in part on i) each of the identified attributes of the plurality of applications, ii) determining that a first set of functions is relevant to a first role of the identified plurality of user roles for the user, and iii) determining that a second set of functions is relevant to a second role of the identified plurality of user roles for the user, wherein the aggregating is based at least in part on eliminating irrelevant functions of the plurality of applications that are not relevant to the identified plurality of user roles for the user; and organizing the aggregated menu items into at least a first function group and a second function group based at least in part on a first job junction specified by a first role of the identified plurality of user roles for the user and a second job function specified by a second role of the identified plurality of user roles for the user;
where the aggregated menu items of the customized menu are displayable in accordance with the organizing at any location amongst the plurality of applications consequent to selection of the user interface element;
wherein the web page is displayed in a first display layer, and wherein the customized menu is displayed in a second display layer over the first display layer, and wherein the first display layer and second display layer are integrated into a single navigator environment such that accessing the customized menu does not navigate away from the web page and accessing the web page does not navigate away from the customized menu; and
wherein the customized menu comprising one or more primary menu items is displayed in the second display layer, and wherein a subordinate menu is displayed in a third display layer over the second display layer in response to a selection of a first primary menu item of the one or more primary menu items, the subordinate menu comprising a first menu item and a second menu item from the first function group or the second function group, wherein accessibility of the first menu item to the identified user and accessibility of the second menu item to the identified user are distinguished based at least in part on the set of user permissions.

2. The method as recited by claim 1, further comprising: receiving, from the user, a selection of a menu item; and navigating to a display screen referenced by the selection.

3. The method as recited by claim 2, wherein the display screen is produced by one of the plurality of applications and is configured to receive input, from the user, for the one of the plurality of applications.

4. The method as recited by claim 1, wherein each of the plurality of applications comprises a component of an integrated business application.

5. The method as recited by claim 1, wherein the first primary menu item resides in a first menu column, and wherein the subordinate menu is configured to be displayable in such a way as to permit a user to view at least a portion of the first menu column while the subordinate menu is displayed.

6. The method as recited by claim 1, wherein the subordinate menu comprises a second menu item type identifier interface element associated with a subordinate menu item on the subordinate menu, such that, when the second menu item type identifier interface element is activated, a second, cascading subordinate menu is displayed.

7. The method as recited by claim 1, wherein the identifying the user comprises mapping at least a portion of the user credentials to a user key that is unique, within the application suite, to the user.

8. The method as recited by claim 7, wherein the identifying the plurality of user roles in the application suite for the user comprises:
maintaining a master list of roles for the application suite, the master list of roles comprising a plurality of roles, each of which is associated with a role key that is unique, within the application suite; and
identifying, from the master list of roles, an array of one or more role keys that are associated with the user key.

9. The method as recited by claim 8, further comprising: maintaining a master hash table of menu templates, each of the menu templates corresponding to one or more roles.

10. The method as recited by claim 9, further comprising: determining one or more menu objects that are available to the user, the determining the one or more menu objects comprising:
iteratively, for each of the role keys in the array of role keys, searching the master hash table to identify one or more menu objects associated with the role key; and
aggregating the identified one or more menu objects to determine the one or more menu objects that are available to the user.

11. The method as recited by claim 10, further comprising:
preparing a set of one or more menu columns, the preparing comprising:
calculating a number of primary menu items from an array of displayable menu items;
calculating a preferred column arrangement comprising a preferred number of menu columns and a preferred column height;
determining one or more menu columns, based on the number of primary menu items and the preferred column arrangement; and
identifying a location in the one or more menu columns for each of the one or more primary menu items, based at least in part on a hierarchy.

12. The method as recited by claim 1, further comprising: generating the web page comprising the menu; and
transmitting the web page from a server computer to a user computer operated by the user.

13. The method as recited by claim 12, wherein the web page comprises a second menu item type identifier interface element, and wherein the menu is displayed in the web page when the second menu item type identifier interface element is activated.

14. The method as recited by claim 12, further comprising:
displaying the web page in the web browser at the user computer.

15. The method as recited by claim 14, wherein the web page is a first web page, the method further comprising:
receiving a selection of a menu item from the user;
based on receiving the selection, generating a second web page with one of the plurality of applications corresponding to the menu item; and
transmitting the second web page to the user computer.

16. The method as recited by claim 1, wherein the generating further comprises:
obtaining, from a data store, a master set of menu items for the plurality of applications, wherein the master set of menu items is organized in a hierarchy and arranged as a set of menu objects, each menu object of the set of menu objects comprising one or more menu items;
determining one or more menu objects that are available to the user, based at least in part on the identified plurality of user roles, from the master set of menu objects, wherein the one or more menu objects collectively comprise the first plurality of menu items;
based on each of the identified attributes of the plurality of applications, determining a second plurality of menu items which correspond to the plurality of applications;
aggregating the first plurality of menu items and the second plurality of menu items into an array of displayable menu items based on the hierarchy, the array of displayable menu items comprising one or more primary menu items and one or more subordinate menu items, each of the subordinate menu items corresponding to one of the one or more primary menu items;
preparing a set of one or more menu columns, each of the menu columns comprising at least one of the one or more primary menu items;
preparing, for a first primary menu item in a first menu column, a subordinate menu comprising a first set of subordinate menu items corresponding to the first primary menu item;
generating the menu comprising the set of one or more menu columns for display in the web browser, wherein the menu comprises a menu item type identifier interface element associated with the first primary menu item indicating a type of the menu item, and wherein the one or more menu items are grouped according to the plurality of user roles;
wherein the preparing the set of one or more menu columns comprises setting a dynamic width of at least one menu column of the set of one or more menu columns based on a length of a label of one of the menu items, and the method further comprises:
receiving a second user input, via the menu item type identifier interface element, selecting the first primary menu item; and
generating, in response to the second user input via the menu item type identifier interface element, the subordinate menu for display in the web browser simultaneously with at least a portion of the menu columns comprising at least one of the one or more primary menu items.

17. The method as recited by claim 1, wherein the subordinate menu is displayed in the third display layer so that the subordinate menu obscures a portion of the second display layer.

18. The method as recited by claim 17, wherein the subordinate menu is displayed in the third display layer so that the subordinate menu does not completely obscure the second display layer.

19. The method as recited by claim 1, wherein the second display layer displaying the one or more primary menu items and the third display layer displaying the subordinate menu make a three dimensional stack so that a third layer dimension is added to the existing height and width dimensions of each layer through a transparent effect.

20. A non-transitory, computer readable medium having embodied thereon a program for providing a user interface for navigating among an application suite comprising a plurality of applications, the program comprising a set of instructions, which, when executed by one or more computers, cause the one or more computers to:
process a set of user credentials received from a user;
identify the user, based at least in part on the set of user credentials;
identify a plurality of user roles in an application suite for the user, based at least in part on the identity of the user;
identify a type of each application of a subset of applications of the plurality of applications within the application suite, wherein the subset comprises applications to which the user is credentialed to access, wherein the type identifies one or more attributes of the application;
provide a web page to a web browser for the user to interact, the web page having a user interface element, the user interface element being based on, at least in part, one of the plurality of applications;
invoke a customized menu for the identified user to be displayed in response to a first user input selecting the user interface element;
generate the customized menu for the identified user, the customized menu comprising aggregated menu items particular to functions of the plurality of applications, each menu item respectively associated with a particular function and with a particular application of the plurality of applications, the generating comprising:
aggregating menu items particular to the functions of the plurality of applications based at least in part on i) each of the identified attributes of the plurality of applications, ii) determining that a first set of functions is relevant to a first role of the identified plurality of user roles for the user, and iii) determining that a second set of functions is relevant to a second role of the identified plurality of user roles for the user, wherein the aggregating is based at least in part on eliminating irrelevant functions of the plurality of applications that are not relevant to the identified plurality of user roles for the user; and
organizing the aggregated menu items into at least a first function group and a second function group based at least in part on a first job junction specified by a first role of the identified plurality of user roles for the user and a second job function specified by a second role of the identified plurality of user roles for the user;
where the aggregated menu items of the customized menu are displayable in accordance with the organizing at any location amongst the plurality of applications consequent to selection of the user interface element;
wherein the web page is displayed in a first display layer, and wherein the customized menu is displayed in a second display layer over the first display layer, and wherein the first display layer and second display layer are integrated into a single navigator environment such that accessing the customized menu does not navigate away from the web page and accessing the web page does not navigate away from the customized menu;
wherein the customized menu comprising at least some plurality of menu items is displayed in the second display layer, and wherein a subordinate menu is displayed in a third display layer over the second display layer in response to a selection of a first primary menu item of one or more primary menu items, the subordinate menu comprising a first menu item and a second menu item from the first function group or the second function group, wherein accessibility of the first menu item to the identified user and accessibility of the second menu item to the identified user are distinguished based at least in part on a set of user permissions.

21. The non-transitory, computer readable medium as recited by claim 20, wherein the application suite comprises the program, and the set of instructions further cause the one or more computers to:
obtain, from a data store, a master set of menu items for the plurality of applications, wherein the master set of menu items is organized in a hierarchy and arranged as a set of menu objects, each of the menu objects comprising one or more menu items;
determine one or more menu objects that are available to the user, based at least in part on the identified plurality of user roles, from the master set of menu objects, wherein the one or more menu objects collectively comprise a plurality of menu items;

based on each of the identified attributes of the plurality of applications, determine a second plurality of menu items which correspond to the plurality of applications;

aggregate the menu comprising at least some of a first plurality of menu items and the second plurality of menu items, wherein the menu further comprises a menu item type identifier interface element associated with a first primary menu item indicating a type of the menu item, and wherein the one or more menu items are grouped according to the plurality of user roles;

process a second user input received, via the menu item type identifier interface element, selecting the first primary menu item; and generate, in response to the second user input via the menu item type identifier interface element, a subordinate menu for display simultaneously with at least a portion of the menu comprising at least some of the plurality of menu items.

* * * * *